(12) United States Patent
Zacks et al.

(10) Patent No.: US 12,052,562 B2
(45) Date of Patent: Jul. 30, 2024

(54) SELECTIVE NETWORK ACCESS BASED ON TRUST LEVEL

(71) Applicant: Cisco Technology, Inc., San Jose, CA (US)

(72) Inventors: David J. Zacks, Vancouver (CA); Thomas Szigeti, Vancouver (CA); Carlos M. Pignataro, Cary, NC (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 152 days.

(21) Appl. No.: 17/474,033

(22) Filed: Sep. 13, 2021

(65) Prior Publication Data

US 2023/0084085 A1    Mar. 16, 2023

(51) Int. Cl.
| | |
|---|---|
| H04L 29/06 | (2006.01) |
| H04L 9/30 | (2006.01) |
| H04L 9/32 | (2006.01) |
| H04W 12/033 | (2021.01) |
| H04W 48/10 | (2009.01) |
| H04L 12/28 | (2006.01) |
| H04L 29/08 | (2006.01) |

(52) U.S. Cl.
CPC ............ *H04W 12/033* (2021.01); *H04L 9/30* (2013.01); *H04L 9/3247* (2013.01); *H04W 48/10* (2013.01); *H04L 2209/80* (2013.01)

(58) Field of Classification Search
CPC ...... H04W 12/033; H04W 48/10; H04L 9/30; H04L 9/3247; H04L 2209/80
See application file for complete search history.

(56) References Cited

U.S. PATENT DOCUMENTS

| | | | |
|---|---|---|---|
| 8,972,589 B2* | 3/2015 | Roese | H04L 41/12 709/219 |
| 10,129,299 B1* | 11/2018 | McClintock | H04L 63/0869 |
| 2012/0174237 A1* | 7/2012 | Krzyzanowski | H04M 1/724631 726/29 |

(Continued)

FOREIGN PATENT DOCUMENTS

EP    2375690 A2 * 10/2011 ............... G01S 5/02

OTHER PUBLICATIONS

Ali Abdullah S. AlQahtani; Hosam Alamleh; Jean Gourd; "BF2FA: Beacon Frame Two-factor Authentication"; 2020 IEEE International Conference on Communication, Networks and Satellite (Comnetsat); Year: Jun. 2020; Conference Paper; Publisher: IEEE; pp. 357-361 (Year: 2020).*

(Continued)

*Primary Examiner* — Fatoumata Traore
*Assistant Examiner* — Courtney D Fields
(74) *Attorney, Agent, or Firm* — Lee & Hayes, P.C.

(57) ABSTRACT

This disclosure describes techniques for enabling selective connections between user devices and trusted network devices. An example method includes receiving a beacon from a network device. The beacon includes a trust level of the network device. The method further includes determining that the trust level of the network device satisfies a predetermined trust criterion. Based on determining that the trust level of the network device satisfies the predetermined trust criterion, the method includes transmitting a connection request to the network device. Further, user data is received from the network device.

20 Claims, 7 Drawing Sheets

(56) References Cited

U.S. PATENT DOCUMENTS

| | | | |
|---|---|---|---|
| 2018/0115901 A1* | 4/2018 | Nenov | G08B 5/36 |
| 2018/0160307 A1* | 6/2018 | Weksler | H04L 63/1433 |
| 2019/0044949 A1 | 2/2019 | Bartfai-Walcott et al. | |
| 2020/0068483 A1 | 2/2020 | Likar et al. | |
| 2020/0280541 A1* | 9/2020 | Walker | H04L 63/0209 |

OTHER PUBLICATIONS

Haofeng, et al., "Wi-Fi Secure Access Control System Based on Geo-fence," 2019 IEEE Symposium on Computers and Communications (ISCC), Jun. 29-Jul. 3, 2019, 6 pages.

* cited by examiner

SELECTIVE NETWORK ACCESS BASED ON TRUST LEVEL

TECHNICAL FIELD

The present disclosure relates generally to network devices that advertise their trust levels and also to selectively connecting to network devices based on trust levels of the network devices.

BACKGROUND

Computer security is increasingly important for enterprises and other organizations. Of particular relevance is maintaining the security of user data traffic transmitted over wireless networks, such as WI-FI networks. Although many organizations maintain service sets for providing wireless services to devices within a building, not all network devices within a given service set necessarily have the same trustworthiness. For example, one device in the service set may be more likely to be compromised than another device in the service set. Using previous technologies, user devices were unable to ascertain whether they were connecting to a relatively trustworthy device or a relatively untrustworthy device in the service set. Accordingly, these wireless networks could only be considered as secure as their least trustworthy network device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
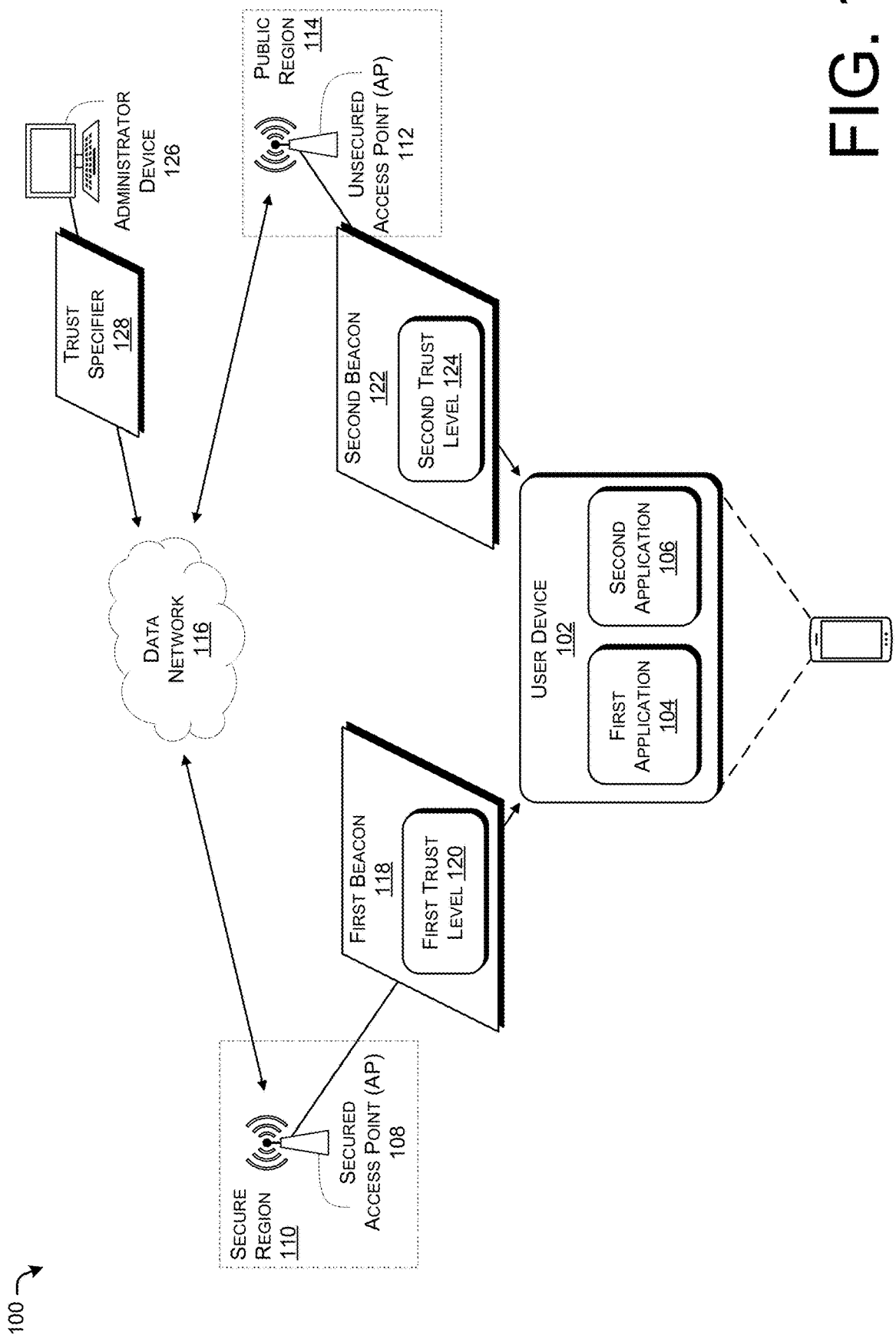
FIG. 1 illustrates an example environment for providing selective network access based on trust levels of various network devices.

An example method includes receiving a beacon from a network device, the beacon including a trust level of the network device; determining that the trust level of the network device satisfies a predetermined trust criterion; based on determining that the trust level of the network device satisfies the predetermined trust criterion, transmitting a connection request to the network device; and based on transmitting the connection request, receiving user data from the network device.

In some examples, the beacon includes a service set identifier (SSID) of a network segment including the network device, the network segment including the network device and one or more additional network devices. The beacon may include timestamp, wherein the connection request is transmitted within a threshold time of the time indicated by the timestamp.

In some implementations, the example method further includes decrypting the trust level using a public key. According to various examples, the example method further includes determining the predetermined trust criterion based on an application operating on a user device, wherein the method is performed by the user device. In some cases, the predetermined trust criterion is a first predetermined trust criterion, the application is a first application, and the method further includes determining a second predetermined trust criterion based on a second application operating on the user device; determining that the trust level of the network device does not satisfy the second predetermined trust criterion; and based on determining that the trust level of the network device does not satisfy the second predetermined trust criterion, deactivating the second application.

According to some implementations, the network device includes a wireless access point (AP) or a base station, wherein the beacon is received over a wireless interface. In some examples, the network device includes a network switch, wherein the beacon is a single-hop message received from the network switch.

Another example method includes generating a beacon including a trust level of a network device; transmitting the beacon; receiving, from a user device, a connection request from the network device; and based on receiving the connection request, transmitting user data to the user device or receiving user data from the user device. In some cases, the beacon includes an SSID of a network segment including the network device, the network segment further including one or more additional network devices. In various examples, the beacon includes a timestamp, wherein the connection request is received within a threshold time of the time indicated by the timestamp. In various implementations, the method includes digitally signing the beacon by encrypting the trust level using a private key. In some cases, transmitting the beacon includes broadcasting the beacon into a coverage area of the network device. In particular examples, the network device includes a wireless AP or a base station, wherein the beacon is transmitted over a wireless interface. In some instances, the network device includes a network switch, wherein the beacon is a single-hop message in a wired network. In various cases, the method further includes receiving an indication of the trust level from an administrator device.

Example Embodiments

This disclosure describes various techniques for informing devices and users to determine whether a network segment can be trusted, prior to connecting to the network segment. In addition, example techniques described herein enable devices and users to determine whether a specific network device in the network segment can be trusted, prior to connecting to the network device. Implementations described herein can apply to both wired and wireless networks.

This disclosure proposes that a network device broadcasts or multicasts a type of network message (e.g., beacon) that advertises the trust level of the network device and/or a network segment including the network device. In some cases, the beacon is incorporated into an existing frame structure, such as a Wi-Fi beacon frame, a probe response, or a management frame. In some cases, the beacon is transmitted independently of an existing frame structure, and may be an Access Network Query Protocol (ANQP) announcement frame or the like. In some wired networks, the beacon may be a single-hop message transmitted from one or more ports of a network switch or router. Unlike a Cisco Discovery Protocol (CDP) or Link Layer Discovery Protocol (LLDP) message, the beacon can be propagated throughout the network by other network devices.

The trust level of the network device may be set by an administrator of the network including the network device. For example, a network device (e.g., an AP) located in a public area (e.g., a campus coffee shop or cafeteria) may be more likely to be physically compromised by a malicious actor, such that the network device may have a relatively low trust level. In contrast, a network device located in a secured area (e.g., a laboratory that is only accessible via badge access), or devices located in that secured area, may be less likely to be compromised, such that the network device may have a relatively high trust level. In addition, the trust level of the network device may change over time, based on maintenance events and software updates of the network device.

In particular cases, the beacon includes a frame with multiple fields. In addition to indicating the trust level of the network device, the beacon may indicate an identifier of the network device, an identifier of the network segment (e.g., an S SID), a sourcing organization of the network device, verification data, or any combination thereof. The verification data may enable a receiving device to assess whether the beacon is being transmitted from the network device. For instance, the beacon may include a timestamp, and the network may restrict the applicability of that beacon to a specific time period after the timestamp. In examples in which the network device transmits the beacon repeatedly and/or periodically, the verification data in the beacon may rotate over time. In addition, at least a portion of the beacon may be digitally signed by the network device using a private key. The receiving device, in turn, may verify the digitally signed beacon using a corresponding public key. In contrast, if the receiving device receives a beacon that it is unable to verify using the verification data, the receiving device may discard and/or ignore the beacon. As a result, various implementations described herein can prevent malicious devices from spoofing the network device.

A client operating on the user device may take certain actions based on the beacon. The user device may connect to the network via the network device based on the beacon. In some cases, the user device may brick or deactivate if the device does not receive a beacon, receives a beacon that the device cannot verify, or receives a beacon indicating less than a threshold trust level. In some cases, the user device may selectively refrain from allowing certain sensitive applications to operate if the trust level is below a certain threshold. As a result, various implementations of the present disclosure can enforce application-based geofencing, wherein certain sensitive applications may only be operable on devices located in relatively secure coverage areas. If a device moves out of a secure coverage area, the device may block operation of the sensitive application. If the device moves into a secure coverage area, the device may activate the sensitive application.

This technology can be applied to both wired and wireless networks. For example, in a wired network, the beacon can be generated and transmitted by a network switch as a single-hop message. In a wireless network, the beacon can be generated and transmitted by an AP or base station to various devices in its coverage area.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for providing selective network access based on trust levels of various network devices. The environment 100 may include a user device 102 that is configured to send and receive data. In various implementations, the user device 102 is a computing device, such as a mobile device (e.g., a mobile phone, tablet computer, laptop computer, smart watch, wearable device, or the like). The user device 102 may include at least one processor configured to perform operations. Instructions for these operations may be stored in memory and/or in a non-transitory computer-readable medium. According to various implementations, the user device 102 includes one or more transceivers configured to transmit and/or receive data wirelessly using any of the wireless protocols described herein.

The user device 102 (e.g., at least one processor in the user device 102) may execute multiple applications, such as a first application 104 and a second application 106. As used herein, the term "application," and its equivalents, can refer to a software program that causes at least one processor of a computing device to perform predefined operations. The first application 104 and the second application 106 perform different types of operations. For example, the operations of the first application 104 may include sending and/or receiving sensitive data, such as financial information, personally identifying information (e.g., a social security number (SSN)), trade secrets, state secrets, or some other type of confidential information. In some cases, the operations of the second application 106 may include sending and/or receiving non-sensitive data, such as social media data, public news articles, public video streams, gaming data, and so on. In various examples, the user device 102 includes a processor configured to perform the operations of the first application 104 and the second application 106. The user device 102 may be configured to suspend the first application 104 or the second application 106 by at least temporarily refraining from executing their respective operations.

The environment 100 further includes multiple access points (APs), such as a secured AP 108. In various examples, the terms "access point," "AP," and their equivalents, may refer to a network device configured to transmit and/or receive data wirelessly from one or more external devices. In some implementations, an AP transmits and/or receives data wirelessly over one or more wireless interfaces. As used herein, the term "interface," and its equivalents, may refer to a medium and/or protocol over which data can be transmitted and/or received between endpoints. An AP may utilize one or more wireless protocols for the reception and/or transmission of data, such as an Institute of Electrical and Electronics Engineers (IEEE) protocol (e.g., WI-FI®, or technique described in IEEE 802.11; BLUETOOTH®, or technique described in IEEE 802.15.1, etc.), a 3$^{rd}$ Generation Partnership Project (3GPP) protocol (e.g., Long Term Evolution (LTE), New Radio (NR), etc.), a Near-Field Communication (NFC) protocol, or any other suitable wireless protocol. For example, an AP may transmit and/or receive electromagnetic signals in the radio frequency (RF) spectrum that encode data.

In various implementations, the secured AP 108 is located in a secure region 110. The secure region 110 may be a geographic region in which access to the region is restricted by one or more security protocols. In some cases, the secure region 110 may be locked with a physical key, such that access to the secure region 110 is limited to individuals that physically possess the physical key. In some implementations, access to the secure region 110 is restricted to individuals who scan an identification (ID) badge and/or present a biometric factor (e.g., a retina, a fingerprint, a voice, etc.) associated with a particular security access level. According to some examples, a threshold selectively provides access to the secure region 110 upon entry of a particular code (e.g., personal identification number (PIN), password, etc.) to a keypad or other input device. Due to the limitations on access of the secure region 110, it may be unlikely that an unauthorized individual can physically access or tamper with the secured AP 108. Accordingly, the secured AP 108 is unlikely to be physically compromised.

The environment 100 may further include other APs, such as an unsecured AP 112. The unsecured AP 112 may be physically located in a public region 114. Unlike the secure region 110, physical access to the public region 114 may be unrestricted. The public region 114 may be open to members of the public that are outside of a trusted organization. In some examples, the public region 114 is a public waiting room, a reception area, a restroom, a cafeteria, a coffee shop, or some other region that can be visited by members of the public. Due to the broad access to the public region 114, the unsecured AP 112 is more likely to be physically accessed or tampered with by an unauthorized individual. Therefore, the unsecured AP 112 is more likely to be physically compromised than the secured AP 108.

Both the secured AP 108 and the unsecured AP 112 may be connected to the same data network 116. The data network 116 may include one or more communication networks. For example, the data network 116 includes at least one wired interface (e.g., an Ethernet interface, an optical interface, etc.), at least one wireless interface (e.g., an AP, a base station, a radio access network (RAN), etc.), or a combination thereof. In some examples, the data network 116 includes one or more routers connected to multiple APs including the secured AP 108 and the unsecured AP 112. In various cases, the data network 116 includes a Wide Area Network (WAN), such as at least a portion of the Internet. For example, the data network 116 may include one or more servers or other computing devices that are configured to transmit and/or receive data. The data network 116, in some cases, includes one or more data centers that each include multiple servers capable of transmitting and/or receiving data. In some cases, at least a portion of the data network 116, the secured AP 108, and the unsecured AP 112 is defined as a network segment. As used herein the term "network segment," "subnet," and its equivalents may refer to a portion of a broader network.

In various implementations, the user device 102 may exchange data with the data network 116 via the secured AP 108 or the unsecured AP 112. In some cases, the secured AP 108 and the unsecured AP 112 may be part of the same network segment, organizational network, or service set. For example, the secured AP 108 and the unsecured AP 112 may share the same Service Set Identifier (SSID). However, the data that passes through the unsecured AP 112 is more vulnerable to interception than the secured AP 108. For example, a malicious actor can intercept the data by physically tampering with the unsecured AP 112. This can be particularly problematic if the user device 102 is sending and/or receiving highly sensitive data.

To prevent these and other problems, the user device 102 may selectively connect to APs based on beacons received from the APs. In various examples, the secured AP 108 may transmit a first beacon 118 to the user device 102. As used herein, the term "beacon," and its equivalents, may refer to a message that indicates information about the sender. Various beacons described herein may be propagated as an Information Element (IE) within an existing network protocol, such as a WI-FI beacon frame or unicast management frame. In some cases, a beacon may be an ANQP announcement frame or other type of message. Example beacons described herein can include an IP header, a differentiated services code point (DSCP), and a payload that may or may not be encrypted in a digitally signed wrapper. Various examples of information that can be included in beacon payloads are described herein. In some implementations, the first beacon 118 is broadcasted or multicasted into a coverage area of the secured AP 108.

The first beacon 118 may include a first trust level 120. As used herein, the term "trust level," and its equivalents, may refer to a metric that indicates a likelihood or extent that a device is secure and uncompromised. Throughout this description, a first device or network segment with a "higher" trust level than a second device or network segment may be less likely to be compromised than the second device or network segment, although implementations are not so limited. In some implementations, trust levels are inversely correlated to the trustworthiness of the corresponding devices. In various cases, the first trust level 120 may indicate an extent to which the secured AP 108, or a network segment including the secured AP 108, can be trusted with transmitting and/or receiving sensitive data. For example, because the secured AP 108 is located within the secure region 110, the first trust level 120 may be a relatively high trust level.

Further, the unsecured AP 112 may transmit a second beacon 122 to the user device 102. In some implementations, the second beacon 122 is broadcasted or multicasted into a coverage area of the unsecured AP 112. The second beacon 122 may include a second trust level 124. The second trust level 124 may indicate an extent to which the unsecured AP 112 can be trusted with transmitting and/or receiving sensitive data. For instance, because the unsecured AP 112 is located within the public region 114, the second trust level 124 may be a relatively low trust level.

In addition to indicating the first trust level 120 and the second trust level 124, the first beacon 118 and the second beacon 124 may each include one or more additional data fields that indicate additional information. In some examples, the first beacon 118 and the second beacon 124 may include identifiers of the sending devices and/or network segments of the sending devices. For instance, the first beacon 118 and the second beacon 124 may include an SSID associated with their network segment(s). In some cases, the first beacon 118 and the second beacon 124 include data fields indicating a sourcing organization associated with the secured AP 108 and the unsecured AP 112. For example, if the secured AP 108 and the unsecured AP 112 share the same manufacturer or are managed by the same institutional organization, the first beacon 118 and the second beacon 124 may indicate that manufacturer or institutional organization. In some implementations, the first beacon 118 and the second beacon 124 further include verification data, which may enable the user device 102 to verify the sources of the first beacon 118 and the second beacon 124.

According to various implementations, the user device 102 may determine whether to connect to the secured AP 108 based on the first trust level 120 in the first beacon 118 and/or may determine whether to connect to the unsecured AP 112 based on the second trust level 124 in the second beacon 122. In some examples, the user device 102 may determine to exchange relatively insensitive data from the data network 116, such as social media browsing data. In these examples, the user device 102 may determine that the relatively low second trust level 124 is sufficient and connect to the unsecured AP 112. By connecting to the unsecured AP 112, the user device 102 may transmit and/or receive data with the data network 116 via the unsecured AP 112.

In particular examples, the user device 102 may determine to exchange relatively sensitive data with the data network 116, such as data carrying trade secrets or other confidential information. In these examples, the user device 102 may determine that the relatively low second trust level 124 is insufficient to satisfy a security requirement of the sensitive data. However, the user device 102 may determine that the relatively high first trust level 120 is sufficient to satisfy the security requirement. Accordingly, the user device 102 may initiate a connection with the secured AP 108, and refrain from connecting to the unsecured AP 112. The user device 102 may transmit and/or receive the sensitive data with the data network 116 via the secured AP 108.

In some examples, the first application 104 and the second application 106 may be associated with different security requirements. In particular, the first application 104 may have a higher security requirement than the second application 106. For instance, the first application 104 may be a banking application through which the user device 102 transmits and receives confidential banking data with a web server in the data network 116. In contrast, the second application 106 may be a gaming application through which the user device 102 transmits and receives gaming data with a web server in the data network 116. In some examples, the relatively low second trust level 124 satisfies the security requirements of the second application 106, but does not satisfy the security requirements of the first application 104. If the user device 102 connects to the unsecured AP 112 (e.g., the user device 102 is in the coverage area of the unsecured AP 112 and is outside of the coverage area of the secured AP 108), the user device 102 may selectively deactivate the first application 104. For example, a client operating on the first application 104 may selectively prevent the first application 104 from receiving and/or transmitting data using a network interface connected to the unsecured AP 112. Accordingly, the user device 102 may prevent the transmission of the sensitive data associated with the first application 104 from passing through the unsecured AP 112.

The secured AP 108 may determine the first trust level 120, and the unsecured AP 112 may determine the second trust level 124, using one or more of a variety of techniques. In some cases, an administrator device 126 informs the secured AP 108 and the unsecured AP 112 about their own, respective trust levels. In some implementations, the administrator device 126 is operated by an administrator or other trusted user responsible for maintaining security in the environment 100. For instance, the administrator may physically visit the secured AP 108 and determine that the secured AP 108 has a relatively high trust level due to its physical presence in the secured region 110. Similarly, the administrator may physically visit the unsecured AP 112 and determine that the unsecured AP 112 has a relatively low trust level due to its presence in the public region 114. The administrator device 126, in various cases, generates a trust specifier 128 indicating the first trust level 120 of the secured AP 108 and/or the second trust level 124 of the unsecured AP 112. The administrator device 126 may transmit the trust specifier 128 to the secured AP 108 and/or the unsecured AP 112. For instance, the administrator device 126 transmits the trust specifier 128 over the data network 116. Thus, the secured AP 108 and/or the unsecured AP 112 may self-report their trust levels as specified by the administrator device 126.

In some cases, the trust levels of APs in the environment 100 change over time. For instance, the unsecured AP 112 may be scheduled for regular maintenance (e.g., once a week). During the maintenance event, a user may confirm that the unsecured AP 112 has not been physically tampered with and/or compromised by a malicious device. The unsecured AP 112 may detect that a maintenance event has occurred (e.g., by receiving a user input signal) and also track the time since the maintenance event has occurred. In some cases, the unsecured AP 112 may determine and/or adjust the second trust level 124 based on a time since the last maintenance event. In particular examples, the second trust level 124 may be inversely correlated to the time since the last maintenance event. For instance, the unsecured AP 112 may set the second trust level 124 at an initial level in the first hour since a maintenance event, and set the second trust level 124 at a subsequent level six days after the maintenance event, wherein the initial level is higher than the subsequent level.

According to some implementations, the trust levels can be adjusted based on software updates. For example, the secured AP 108 may receive a software update from the data network 116 and execute the software update. The software update may include software configured to reduce security vulnerabilities of the secured AP 108. In some cases, the secured AP 108 may determine a time since the software update has been executed and adjust the first trust level 120 based on the time since the software update has been executed. For example, the first trust level 120 is inversely correlated to the time since the software update was executed. In particular cases, the secured AP 108 may set the first trust level 120 at an initial level in the first hour since the software update, and set the first trust level at a subsequent level one week after the software update, wherein the initial level is higher than the subsequent level.

In some cases, the trust levels can be adjusted based on when the public region 114 is closed to the public. For example, the public region 114 may be open to the public on weekdays form 9 AM to 5 PM, but may be restricted from public access at other times. In various implementations, the unsecured AP 112 may set the second trust level 124 at a relatively low level during the time intervals in which the public region 114 is open to the public, and at a relatively high level during the time intervals in which the public region 114 is restricted from public access.

The APs in the environment 100 may perform additional techniques to ensure that the user device 102 is accurately informed of their respective trust levels before connecting to the data network 116 via the APs. In some implementations, the secured AP 108 digitally signs the first beacon 118. For example, the secured AP 108 generates a digital signature based on the first trust level 120 and a private key. The first beacon 118 transmitted to the user device 102 includes the digital signature, which includes a digital signature wrapper around the first trust level 120. The user device 102 may verify the digital signature based on a public key. In various implementations, the user device 102 selectively accepts the first trust level 120 upon verifying the digital signature in the first beacon 118. However, if the user device 102 is unable to verify the digital signature, the user device 102 may reject the first beacon 118. Thus, the user device 102 may be prevented from connecting to an unauthorized network device spoofing the secured AP 108.

In some examples, the APs in the environment 100 impose time limits on when the user device 102 can connect to the APs based on the transmitted beacons. For example, the unsecured AP 112 may specify a time limit in the second beacon 122. The time limit, for instance, may include a timestamp indicating the time at which the second beacon 122 is transmitted and/or a time interval during which the second beacon 122 is reliable. To initiate a connection with the unsecured AP 112, the user device 102 may transmit a connection request to the unsecured AP 112 within the time interval specified by the second beacon 122. In addition, before establishing the connection with the user device 102, the unsecured AP 112 may confirm that the connection request is received during the time interval. Accordingly, the user device 102 and the unsecured AP 112 may confirm that the user device 102 is relying on a current version of the second beacon 122 by which to connect to the unsecured AP 112.

Although the first beacon 118 and second beacon 122 have been described as wireless transmissions, implementations are not so limited. In some implementations, similar techniques can be used to enable secure connections within a wired network. For example, a network switch may transmit a beacon that is a single-hop message within the network. The beacon transmitted in the wired network can include a trust level of the network switch. A receiving device may determine whether to connect to the network switch based on the beacon and the trust level, similarly to how the user device 102 may determine whether to connect to the secured AP 108 and/or the unsecured AP 112.

Figure 2:
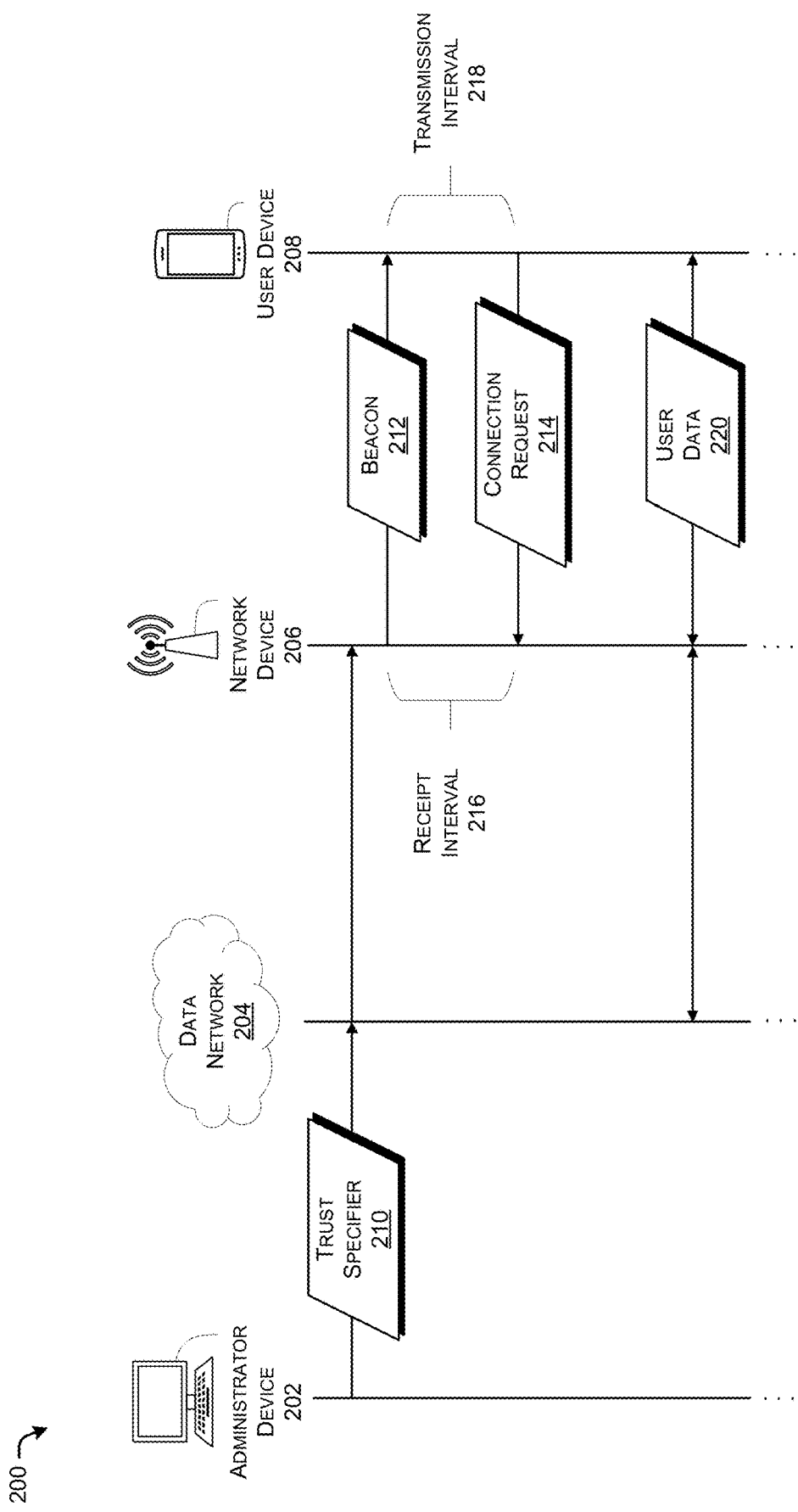
FIG. 2 illustrates example signaling for facilitating trust-based connections.

FIG. 2 illustrates example signaling 200 for facilitating trust-based connections. As shown, the signaling is between an administrator device 202, a data network 204, a network device 206, and a user device 208. In some cases, the administrator device 202 is the administrator device 126 described above with reference to FIG. 1; the data network 204 is the data network 116 described above with reference to FIG. 1; the network device 206 is the secured AP 108 or the unsecured AP 112 described above with reference to FIG. 1; the user device 208 is the user device 102 described above with reference to FIG. 1; or any combination thereof.

The administrator device 202 may transmit a trust specifier 210 to the network device 206. In various cases, the trust specifier 210 indicates a trust level of the network device 206. For example, the administrator device 202 may be operated by a user who can manually assess the vulnerability of the network device 206 to malicious interference. If the user determines that the network device 206 is located in a relatively public location, such as a cafeteria or public waiting room, the user may assign a relatively low trust level to the network device 206. On the other hand, if the user determines that the network device 206 is located in a relatively secure location, such as a room with restricted access, the user may assign a relatively high trust level to the network device 206. The administrator device 202 transmits the trust specifier 210 to the network device 206 via the data network 206, in some cases. In some examples, the network device 206 transmits the trust specifier 210 to the network device 206 without routing the trust specifier 210 through the data network 204.

Although not shown in FIG. 2, the administrator device 202 may distribute multiple trust specifiers to respective network devices within an environment, such as a building. In some cases, the multiple network devices are part of the same network. For instance, the multiple network devices may share the same SSID, even though they may be assigned different trust levels. In some cases, the administrator device 202 assigns a common trust specifier to multiple network devices in the same network segment.

The network device 206 may transmit a beacon 212 to the user device 208. In various cases, the beacon 212 includes the trust level of the network device 206 or a network segment including the network device 206. According to various implementations, the beacon 212 includes the trust level indicated in the trust specifier 210. In some cases, the network device 206 adjusts the trust level based on a time since a previous maintenance event on the network device 206 or network segment occurred, a time since a software update of the network device 206 or network segment occurred, a public access schedule of the network device 206 or network segment, or some other event. In various examples, the trust level in the beacon 212 is no higher than the trust level indicated by the trust specifier 210.

The beacon 212 may additionally include other information. The beacon 212 may indicate a name of the network device 206 and/or network segment. For example, the beacon 212 may indicate the SSID of the service set that includes the network device 206 or a name assigned to the network device 206 itself. In some examples, the beacon 212 indicates a sourcing organization of the network device 206. The sourcing organization, for example, may be the organization that produces the beacon 212. For example, if the network device 106 is owned and/or operated by a business for use within a building of the business, the sourcing organization may be the business itself. In some implementations, if the network device 106 is leased or operated by a different provider, the sourcing organization may be the different provider, even if the network device 106 is located in the premises of the business.

In some examples, the beacon 212 includes instructions for how to establish a connection with the network device 206. The beacon 212 may indicate capability information, such as whether the network device 206 supports polling and/or encryption techniques utilized by the network device 206. The beacon 212 may indicate one or more data rates supported by the network device 206. The beacon 212 may indicate a parameter set of the network device 206. In some cases, the beacon 212 indicates a frequency spectrum supported by the network device 206. For instance, the beacon 212 may indicate a reception frequency of the network device 206 and/or a transmission frequency of the network device 206. The beacon 212 may include a traffic indication map (TIM) indicating data traffic at the network device 206. In particular cases, the beacon 212 is transmitted periodically by the network device 206. The beacon 212 may indicate a transmission interval and/or frequency at which the beacon 212 is periodically transmitted.

According to some examples, the beacon 212 includes verification information. The verification information, for example, may include a timestamp. In particular cases, the timestamp can be used, by the network device 206 or the user device 208, to also enforce time limits on the applicability of the beacon 212. For example, the beacon 212 may be valid for a limited period of time and may indicate time-limited connection information. In some cases, the beacon 212 indicates the time limit or the user device 208 may be aware of (e.g., store) an indication of the time limit prior to receiving the beacon 212. In some examples, the timestamp may also enables the user device 206 to time-synchronize with the network device 206.

In various cases, the verification information includes a digital signature. For example, the network device 206 may be configured to digitally sign the beacon 212 by encrypting at least a portion of the beacon 212 using a private key. In some cases, the private key is provided by the administrator device 202 (e.g., in the trust specifier 210). For example, the network device 206 may encrypt the trust level and/or the timestamp in the beacon 212. Upon receiving the beacon 212, the user device 208 may verify that the beacon 212 was transmitted by the network device 206 by decrypting the encrypted data using a public key. For example, the user device 208 may have been provide the public key by the administrator device 202 or some other device within a trusted organization.

The user device 208 may transmit a connection request 214 to the network device 206 based on the beacon 212. In various implementations, the user device 208 transmits the connection request 214 in response to determining that the trust level included in the beacon 212 satisfies a trust criterion of the user device 208 and/or verifying the beacon 212. For example, the user device 208 may determine that the trust level is above a threshold trust level associated with one or more applications operating on the user device 208. The connection request 214 may be generated in accordance with the connection information specified in the beacon 212. For example, the connection request 214 may be transmitted over one or more reception frequencies of the network device 206.

A time interval between the time at which the beacon 212 is transmitted by the network device 206 and the time at which connection request 214 is received by the network device 206 is defined as a receipt interval 216. In various examples, the network device 206 confirms that the receipt interval 216 is shorter than or equal to the time limit during which the beacon 212 is active. For example, if the user device 208 determines that the timestamp in the beacon 212 is less than a threshold time ago, the user device 208 may transmit the connection request 212, such that the transmission interval 218 is shorter than or equal to the threshold time. The threshold time may represent the time limit during which the beacon 212 is active.

A time interval between the time at which the beacon 212 is received by the user device 208 and the time at which the connection request 214 is transmitted by the user device 208 is defined as a transmission interval 218. In some cases, the user device 208 confirms that the transmission interval 218 is shorter than or equal to the time limit during which the beacon 212 is active. If the receipt interval 216 or the transmission interval 218 is longer than the time limit, the network device 206 and/or the user device 208 may prevent a connection from being initiated between the network device 206 and the user device 208.

In various implementations, the network device 206 establishes a connection with the user device 208 based on the connection request 214. Although not illustrated in FIG. 2, the network device 206 and the user device 208 may exchange one or more additional messages that establish the connection. The connection may define at least one interface between the network device 206 and the user device 208 over which data can be transmitted.

Once the network device 206 and the user device 208 are connected, the user device 208 and the data network 204 may communicate user data 202 via the network device 206. For example, the network data 206 may relay the user data 220 between the data network 204 and the user device 208. The user data 220 may include any type of user plane data. In various examples, the user device 208 may transmit the user data 220 to one or more web servers in the data network 204. In some cases, the user device 208 may receive the user data 220 from one or more web servers in the data network 204. The user data 220 may carry services, such as voice data, internet browsing data, streaming data, and so on.

Figure 3:
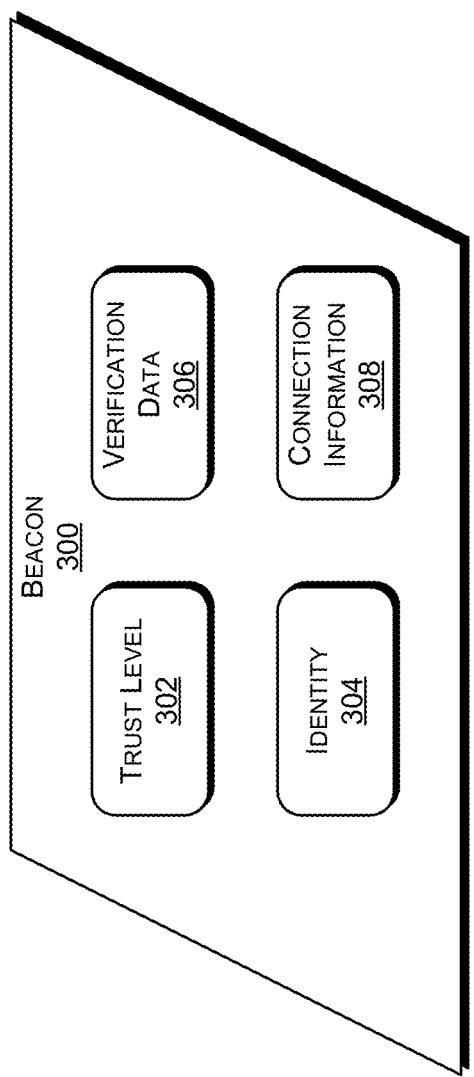
FIG. 3 illustrates an example of a beacon according to various implementations of the present disclosure.

FIG. 3 illustrates an example of a beacon 300 according to various implementations of the present disclosure. The beacon 300, for example, may be the first beacon 118, the second beacon 122, or the beacon 212 described above with reference to FIGS. 1 and 2. The beacon 300 may be transmitted (e.g., broadcasted) by a network device, such as an AP or network switch. In some cases, the beacon 300 is transmitted repeatedly and/or periodically into a coverage area of the network device or to devices located within a single hop of the network device. The beacon 300, for example, is a probe response, management frame, an ANQP announcement frame, or the like.

The beacon 300 may include multiple fields, including a trust level 302. In various implementations, the trust level 302 is the trust level of the network device transmitting the beacon 300. That is, the network device may self-advertise the trust level 302 to other devices. In some cases, the network device receives an indication of the trust level 302 from an external device, such as an administrator device. In some cases, the trust level 302 may indicate a restrictiveness of physical access to the network device. For example, if the network device is located in a public area and/or can be physically accessed by members of the public, the trust level 302 may be relatively low. However, if the network device is located in a secure area and/or physical access to the network device is restricted to a limited selection of trusted individuals (e.g., the space containing the network device is locked and/or protected by badge access or some other physical security measure), then the trust level 304 may be relatively high.

The beacon 300, in some cases, includes an identity 304. The identity 304 may be uniquely associated with the network device and/or a network containing the network device. For instance, in some cases, the identity 304 includes an S SID of the network device and/or the network. In various cases, the identity 304 indicates an address of the network device or some other identifier (e.g., an ID code, a name, a location, etc.) of the network device.

In various implementations, the beacon 300 includes a verification data 306. The verification data 306 may include timestamp indicating a time at which the beacon 300 is generated and/or transmitted by the network device. The timestamp may be used by a receiving device to identify whether the beacon 300 is active. For example, the network device may selectively establish a connection with the receiving device based on a connection request that is transmitted and/or received during a limited period of time in which the beacon 300 is active. In some cases, the receiving devices uses the timestamp to synchronize with the network device. According to some examples, the verification data 306 may include a digital signature. In some cases, the digital signature encrypts the verification data 306 and/or any other data included in the beacon 300. The network device may encrypt the data in the beacon 300 using a private key. In turn, a receiving device may decrypt the data in the beacon 300 using a public key. Accordingly, the verification data 306 may enable the receiving device to verify the source of the beacon 300.

The beacon 300 may additionally include connection information 308. The connection information 308 includes any information that can be used by the receiving device to establish a connection with the network device. For example, the connection information 308 includes one or more instructions for establishing the connection with the network device. In some cases, the connection information 308 specifies one or more (radio) frequencies or times over which a connection request can be transmitted in order to initiate a successful connection. In some examples, the connection information 308 may indicate a time limit in which the beacon 300 is active.

In various implementations, at least a portion of the information within the beacon 300 is encrypted. For example, a digitally signed wrapper may enclose the trust level 302, the identity 304, and the verification data 306. In some cases, the wrapper may further enclose other network segment data (e.g., metadata) related to the sending device. For instance, the other network segment data may indicate the trust level of one or more other network segments within the network. Thus, the receiving device may ascertain context about not only the network segment associated with the beacon 300, but other possible network segments that the receiving device may connect to in in the network that contains the network segments. Further, the beacon 300 may include an IP header and/or a MAC header, which may be outside of the digitally signed wrapper.

Figure 4:
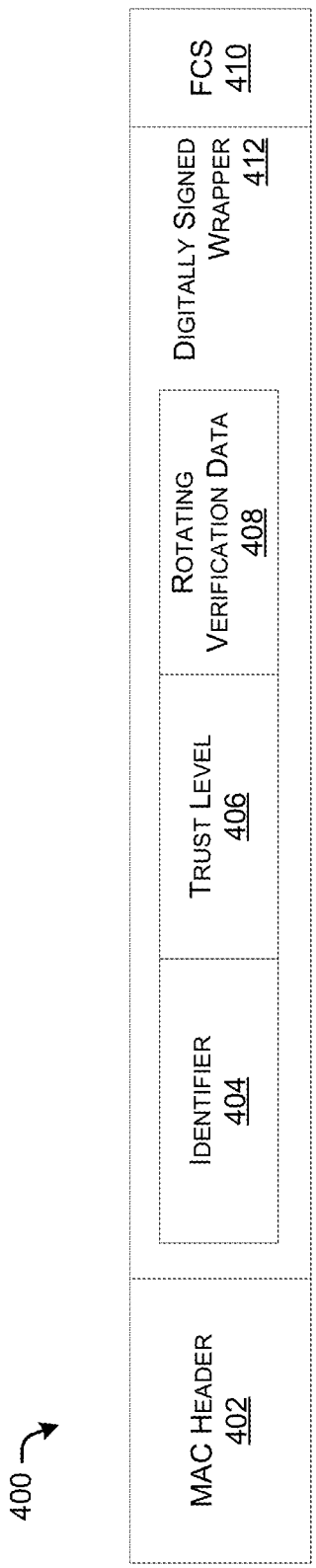
FIG. 4 illustrates an example beacon transmitted by a wireless access point (AP).

FIG. 4 illustrates an example beacon 400 transmitted by a wireless AP. The beacon 400, for example, may be the first beacon 118, the second beacon 122, the beacon 212, or the beacon 300 described above with reference to FIGS. 1 to 3. In some cases, the beacon 400 is transmitted repeatedly and/or periodically into a coverage area of the AP. The beacon 400 includes multiple fields, including a header 402, an identifier 404, a trust level 406, rotating verification data 408, and a frame check sequence (FCS) 410. The identifier 404, trust level 406, and rotating verification data 408 may be packaged in a digitally signed wrapper 412.

The header 402 may indicate information about the beacon 400. In some cases, the header 402 includes a frame control field that indicates that the beacon 400 is a management frame. In some examples, the header 402 indicates a duration allocated for the transmission of the beacon 400. In various examples, the header 402 may include an address (e.g., a media access control (MAC) address) that uniquely identifies a network interface controller (NIC) of the wireless AP.

The identifier 404 may specifically identify the network segment including the AP. For example, the identifier 404 may include an SSID of the network segment. In some cases, the identifier 404 indicates a sourcing organization of the AP.

The trust level 406 may indicate a trustworthiness of the AP transmitting the beacon 400 and/or a network segment including the AP. In various implementations, the trust level 406 is associated with a level to which the AP is physically accessible to the public, a time since a maintenance event was performed on the AP, a time since software of the AP was performed, or the like. The trust level 406 may indicate, to the receiving device, whether the AP is sufficiently trusted to exchange data between the receiving device and a data network.

The rotating verification data 408 may include data that enables a receiving device to verify the beacon 400 and/or the AP. In some examples, the rotating verification data 408 includes a timestamp, wherein the beacon 400 is active within a threshold time period after the time indicated in the timestamp. The rotating verification data 408 changes over time as the beacon 400 is repeatedly and/or periodically transmitted by the AP. The FCS 410, in various cases, includes a cyclic redundancy check.

Figure 5:
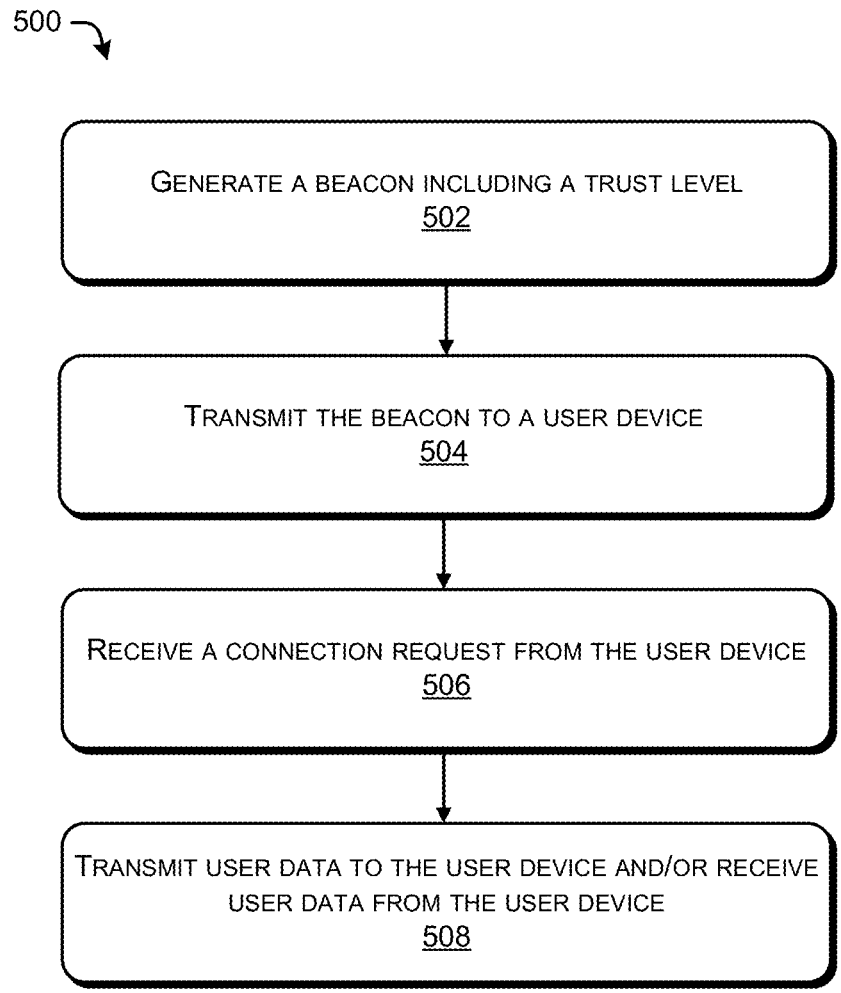
FIG. 5 illustrates an example process for reporting a trust level to a receiving device.

FIG. 5 illustrates an example process 500 for reporting a trust level to a receiving device. The process 500 may be performed by an entity including, for instance, the secured AP 108, the unsecured AP 112, or the network device 206 described above with reference to FIGS. 1 and 2.

At 502, the entity generates a beacon including a trust level. The trust level is of the entity itself or a network segment that includes the entity. According to some examples, the network segment may include the entity and one or more additional network devices. In some cases, the beacon includes additional data. For instance, the beacon may include an identifier of the entity or the network segment, such as an SSID of the network segment. The beacon may further include verification data. For example, the beacon may include a timestamp or another type of rotatable data that can be used to verify that the beacon is active and current. In some examples, the beacon includes a digital signature. For instance, the entity may digitally sign the beacon by encrypting one or more components of the beacon using a private key.

At 504, the entity transmits the beacon to a user device. According to some examples, the beacon is transmitted in a coverage area of the entity. For example, the beacon may be broadcast by the entity into the coverage area. In some implementations, the beacon is wirelessly transmitted by the entity. In some examples, the beacon is transmitted as a single-hop message from the entity to the user device in a wired network.

At 506, the entity receives a connection request from the user device. According to some examples, the connection request is transmitted and/or received within a threshold time period of a time indicated by the timestamp in the beacon. The threshold time period may be representative of a limited time period during which the beacon is active and current. In various implementations, the entity and the user device may establish a communication interface based on the connection request. The communication interface may include a wired interface, a wireless interface, or both.

At 508, the entity transmits user data to the user device and/or receives user data from the user device. For example, the entity and the user device may exchange one or more data packets carrying user plane data over the established communication interface. In some examples, the entity relays the user data between the user device a data network. For example, the entity may relay the user data between the user device and a web server or other user device.

Figure 6:
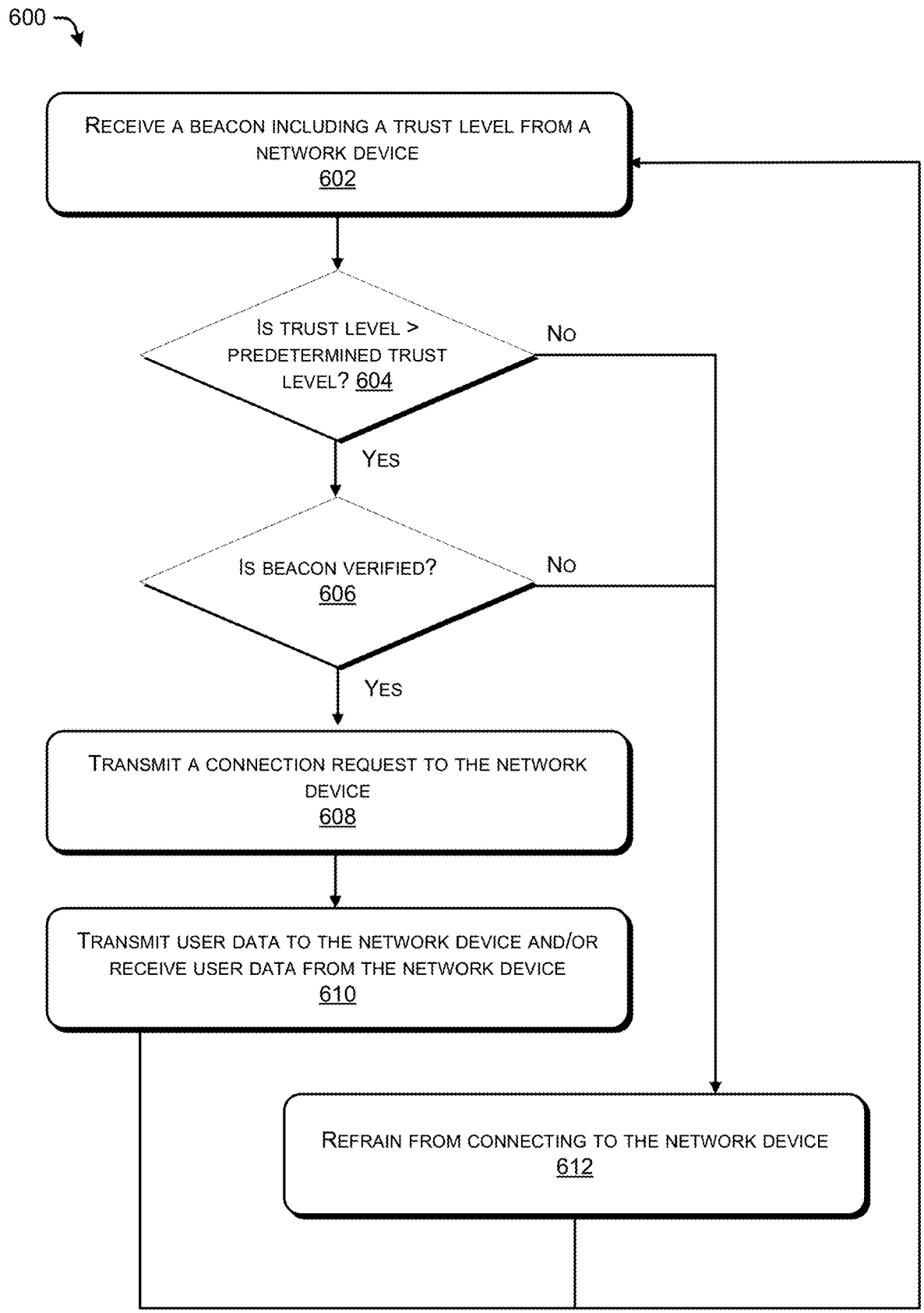
FIG. 6 illustrates an example process for connecting to a network device based on a trust level.

FIG. 6 illustrates an example process 600 for connecting to a network device based on a trust level. The process 600 may be performed by an entity including, for instance, the user device 102 or the user device 208 described above with reference to FIGS. 1 and 2.

At 602, the entity receives a beacon including a trust level from a network device. The trust level is of the network device or a network segment that includes the network device. According to some examples, the network segment may include the network device and one or more additional network devices. In some cases, the beacon includes additional data. For instance, the beacon may include an identifier of the network device or the network segment, such as an SSID of the network segment. The beacon may further include verification data. For example, the beacon may include a timestamp or another type of rotatable data that can be used to verify that the beacon is active and current. In some examples, the beacon includes a digital signature. For instance, the network device may digitally sign the beacon by encrypting one or more components of the beacon using a private key. The entity may verify the beacon by decrypting the one or more components using a public key.

At 604, the entity determines whether the trust level is greater than a predetermined trust level. The determination of whether the trust level is greater than a predetermined trust level is one example of a predetermined trust criterion. In some examples, the trust level is a Boolean value indicating that the entity is trusted or untrusted, and the entity may determine whether the trust level is trusted rather than untrusted. In some implementations, the trust level is inversely correlated to the trustworthiness of the network device, such that the entity determines whether the trust level of the network device is lower than a predetermined trust level. Other criteria can be used by the entity to assess whether the network device is sufficiently trustworthy. In some examples, the predetermined trust criterion and/or predetermined trust level are associated with an application operating on the entity. For instance, an application configured to handle sensitive data may have a more stringent trust criterion than an application configured to handle nonsensitive data. According to some implementations, multiple applications may be operating on the entity, wherein the multiple applications have different respective If the entity determines that the trust level is greater than the predetermined trust level at 604, then the process 600 proceeds to 606. At 606, the entity determines whether the beacon is verified. In some implementations, the beacon includes rotating verification data that the entity can use to determine whether the beacon is active and current. For instance, the beacon may include a timestamp and the beacon is active within a threshold time period of the time indicated by the timestamp. The entity may verify the beacon by determining that a current time is within the threshold time period of the time indicated by the timestamp. Otherwise, the entity may determine that the beacon is not verified.

If the entity determines that the beacon is verified at 606, then the process 600 proceeds to 608. At 608, the entity transmits a connection request to the network device. In some implementations, the connection request is transmitted within the threshold time period of the time indicated by the timestamp. Based on the connection request, the entity may establish a communication interface with the network device.

At 610, the entity transmits user data to the network device and/or receives network data from the network device. For example, the entity and the network device may exchange one or more data packets carrying user plane data over the established communication interface. In some examples, the network device relays the user data between the entity and a data network. For example, the network device may relay the user data between the entity and a web server or other user device. After 610, the process 600 may return to 602.

If, however, the entity determines that the trust level is not greater than the predetermined trust level at 604, or the entity determines that the beacon is not verified at 606, then the process 600 proceeds to 612. At 612, the entity refrains from connecting to the network device. After 612, the process 600 may return to 602.

Figure 7:
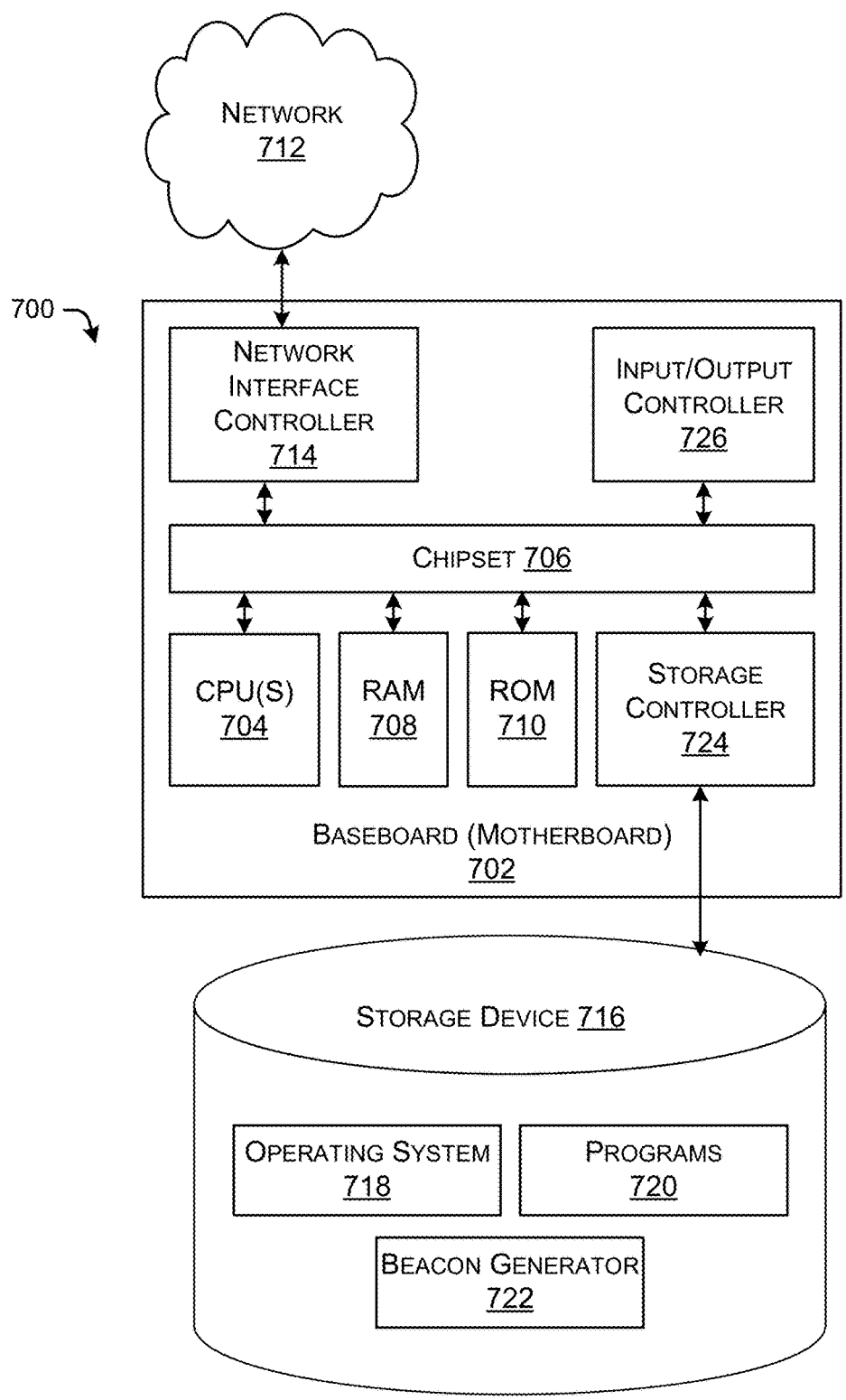
FIG. 7 shows an example computer architecture for a server computer capable of executing program components for implementing the functionality described above.

FIG. 7 shows an example computer architecture for a server computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server computer 700 may, in some examples, correspond to a network device described herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a random-access memory (RAM) 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 712. The chipset 706 can include functionality for providing network connectivity through a network interface controller (NIC) 714, such as a gigabit Ethernet adapter. The NIC 714 is capable of connecting the computer 700 to other computing devices over the network 712. It should be appreciated that multiple NICs 714 can be present in the computer 700, connecting the computer 700 to other types of networks and remote computer systems. In some instances, the NICs 714 may include at least on ingress port and/or at least one egress port.

The computer 700 can be connected to a storage device 716 that provides non-volatile storage for the computer. The storage device 716 can store an operating system 718, programs 720, a beacon generator 722, and data, which have been described in greater detail herein. The storage device 716 can be connected to the computer 700 through a storage controller 724 connected to the chipset 706. The storage device 716 can consist of one or more physical storage units. The storage controller 724 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 700 can store data on the storage device 716 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 716 is characterized as primary or secondary storage, and the like.

For example, the computer 700 can store information to the storage device 716 by issuing instructions through the storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 716 by detecting the physical states or characteristics of one or more particular locations within the physical storage units.

In addition to the mass storage device 716 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by any network node described herein may be supported by one or more devices similar to computer 700. Stated otherwise, some or all of the operations performed by a network node may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 716 can store an operating system 718 utilized to control the operation of the computer 700. According to one embodiment, the operating system comprises the LINUX™ operating system. According to another embodiment, the operating system includes the WINDOWS' SERVER operating system from MICROSOFT Corporation of Redmond, Washington. According to further embodiments, the operating system can comprise the UNIX™ operating system or one of its variants. It should be appreciated that other operating systems can also be utilized. The storage device 716 can store other system or application programs and data utilized by the computer 700.

In one embodiment, the storage device 716 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

As illustrated in FIG. 7, the storage device 716 stores programs 720, which may include one or more processes. The process(es) 724 may include instructions that, when executed by the CPU(s) 704, cause the computer 700 and/or the CPU(s) 704 to perform one or more operations. The beacon generator 722, for example, may be implemented as a program for generating and transmitting beacons as described elsewhere in the present disclosure The computer 700 can also include one or more input/output controllers 726 for receiving and processing input from a number of input devices, such as a keyboard, a mouse, a touchpad, a touch screen, an electronic stylus, or other type of input device. Similarly, an input/output controller 726 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
receiving a beacon from a network device, the beacon comprising a trust level of the network device, wherein the trust level of the network device indicates whether the network device is physically located in a locked space to which access is restricted;
determining that the trust level of the network device satisfies a predetermined trust criterion;
based on determining that the trust level of the network device satisfies the predetermined trust criterion, transmitting a connection request to the network device; and
based on transmitting the connection request, receiving user data from the network device.

2. The method of claim 1, wherein the beacon comprises a service set identifier (SSID) of a network segment comprising the network device, the network segment comprising the network device and one or more additional network devices.

3. The method of claim 1, wherein the beacon comprises a timestamp, and
wherein the connection request is transmitted within a threshold time of a time indicated by the timestamp.

4. The method of claim 1, further comprising:
determining the predetermined trust criterion based on an application operating on a user device,
wherein the method is performed by the user device.

5. The method of claim 4, the predetermined trust criterion being a first predetermined trust criterion, the application being a first application, the method further comprising:
determining a second predetermined trust criterion based on a second application operating on the user device;
determining that the trust level of the network device does not satisfy the second predetermined trust criterion; and
based on determining that the trust level of the network device does not satisfy the second predetermined trust criterion, deactivating the second application.

6. The method of claim 1, wherein the network device comprises a wireless access point (AP) or a base station, and the beacon is received over a wireless interface, or
wherein the network device comprises a network switch, and the beacon is a single-hop message received from the network switch.

7. The method of claim 1, wherein access to the locked space is restricted to individuals that present at least one of a physical key, an identification badge, a biometric factor, or a code.

8. A system, comprising:
at least one processor; and
memory storing instructions that, when executed by the system, cause the system to perform operations comprising:
generating a first beacon comprising a first trust level of a network device at a first time, the first trust level indicating that physical access to the network device is unrestricted at the first time;
transmitting the first beacon;
generating a second beacon comprising a second trust level of a network device at a second time, the second trust level indicating that physical access to the network device is restricted at the second time;
transmitting the second beacon;
in response to transmitting the second beacon, receiving, from a user device, a connection request from the network device; and
based on receiving the connection request, transmitting user data to the user device or receiving user data from the user device.

9. The system of claim 8, wherein the first beacon comprises a service set identifier (SSID) of a network segment comprising the network device, the network segment further comprising one or more additional network devices.

10. The system of claim 8, wherein the first beacon comprises a timestamp, and
wherein the connection request is received within a threshold time of a third time indicated by the timestamp.

11. The system of claim 8, wherein generating the first beacon comprises:
digitally signing the first beacon by encrypting the first trust level using a private key.

12. The system of claim 8, wherein transmitting the first beacon comprises broadcasting the first beacon into a coverage area of the network device.

13. The system of claim 8, wherein the network device comprises a wireless access point (AP) or a base station, and
wherein the first beacon is transmitted over a wireless interface.

14. The system of claim 8, wherein the network device comprises a network switch, and
wherein the first beacon is a single-hop message in a wired network.

15. The system of claim 8, wherein the operations further comprise:
receiving an indication of the first trust level from an administrator device.

16. The system of claim 8, wherein physical access to the network device at the second time is restricted to individuals that present at least one of a physical key, an identification badge, a biometric factor, or a code.

17. A system, comprising:
a first network device comprising:
at least one first processor; and
first memory storing first instructions that, when executed by the first network device, cause the first network device to perform first operations comprising:
generating a first beacon comprising a service set identifier (SSID) and a trust level of the first network device, wherein first network device is physically located in a locked space to which access is restricted to individuals that present at least one of a physical key, an identification badge, a biometric factor, or a code;
periodically transmitting the first beacon;
receiving, from a user device, a connection request; and
based on receiving the connection request:
transmitting first user data to the user device; and
receiving second user data from the user device; and
a second network device comprising:
at least one second processor; and
second memory storing second instructions that, when executed by the second network device, cause the second network device to perform second operations comprising:

generating a second beacon comprising the SSID and a trust level of the second network device, wherein the second network device is located in a geographical region to which physical access in unrestricted, the trust level of the second network device being lower than the trust level of the first network device; and periodically transmitting the second beacon.

18. The system of claim 17, wherein generating the first beacon comprises:

digitally signing the first beacon by encrypting the SSID and trust level of the first network device using a private key.

19. The system of claim 17, wherein the first beacon further comprises a timestamp, and wherein the connection request is received within a threshold time period of a time indicated by the timestamp.

20. The system of claim 17, wherein the first beacon is periodically transmitted into a first coverage area, wherein the second beacon is periodically transmitted into a second coverage area, and wherein the first coverage area overlaps the second coverage area.

\* \* \* \* \*